United States Patent [19]
Eckberg et al.

[11] Patent Number: 5,363,261
[45] Date of Patent: Nov. 8, 1994

[54] DISK DRIVE ACTUATOR LATCH

[75] Inventors: Eric A. Eckberg; Bruce P. Kruger; Richard E. Lagergren, all of Rochester; Brian E. Schultz, Lakeville; Amy L. Warner, Rochester, all of Minn.

[73] Assignee: International Business Machines Corporation, Armonk, N.Y.

[21] Appl. No.: 149,882

[22] Filed: Nov. 10, 1993

[51] Int. Cl.[5] ............................................. G11B 5/54
[52] U.S. Cl. ..................................................... 360/105
[58] Field of Search ......................................... 360/105

[56] References Cited

U.S. PATENT DOCUMENTS

| 4,562,500 | 12/1985 | Bygnes | 360/105 |
|---|---|---|---|
| 4,881,139 | 11/1989 | Hazebrouck | 360/105 |
| 5,003,422 | 3/1991 | Sun et al. | 360/105 |
| 5,117,318 | 5/1992 | Immler et al. | 360/105 |
| 5,208,713 | 5/1993 | Lindsay et al. | 360/105 |
| 5,231,556 | 7/1993 | Blanks | 360/105 |

FOREIGN PATENT DOCUMENTS

| 411552A | 2/1991 | European Pat. Off. |
| 60-214481 | 10/1988 | Japan |
| 1253878 | 10/1989 | Japan |
| 4-26968 | 1/1992 | Japan |
| 4-26969 | 1/1992 | Japan |

OTHER PUBLICATIONS

IBM Technical Disclosure Bulletin, vol. 36, No. 3, Mar. 1993, pp. 7–9, M. Sri-Jayantha and V. D. Khanna, "A Bistable, Zero Steady-State Power, Rotary-Actuator Lock for DASD."

*Primary Examiner*—A. J. Heinz
*Attorney, Agent, or Firm*—Laurence R. Letson

[57] ABSTRACT

A magnetic bistable latch mechanism for latching the actuator of a disk drive in a parked position is described. The latch comprises a magnetically detented latch lever which engages and latches a latch arm in a parked position. The latch arm is part of actuator motor structure and accordingly latches the actuator motor. The latch lever is held in either the latched or unlatched position by magnetic attraction and resists shocks and impacts that otherwise would move the actuator. The latch lever is shifted from one position t the other by the actuator motor eliminating the need for additional circuitry or mechanisms to control the latch. Additionally, the latch does not consume any electrical power in either the latched or unlatched condition.

13 Claims, 3 Drawing Sheets

DISK DRIVE ACTUATOR LATCH

FIELD OF THE INVENTION

This invention relates to disk drives and specifically to the actuator latch which prevents any movement of the slider onto the data recording region of a stationary magnetic disk, and thereby prevents damage to the surface of the magnetic disk and the resultant loss of magnetically stored data.

BACKGROUND OF THE INVENTION

Any time the rotating magnetic disk of a disk drive is brought to a stopped condition, there is no aerodynamic cushion available to float or fly the magnetic head above the surface. To prevent damage to the surface of a magnetic disk whenever not rotating, it is conventional to park the magnetic head/slider in a landing zone so that contact with the disk by the slider will not cause any significant damage and will not destroy magnetically recorded data. However, simply parking the read/write head does not address the possibility that the disk drive might be impacted by a force sufficient to dislodge the actuator from its parked position, and thus moving the slider onto the recording surface of the magnetic disk. Accordingly, it is important that the actuator which positions the slider must be restricted or otherwise held in its parked position to prevent any scratching of the data recording region of the disk surface by slider movement over the surface without an interposed aerodynamic film and minimize stiction between the slider and disk by holding the slider in the landing zone.

Extremely smooth surfaces exist on both the disk surface and the magnetic recording face of the slider attached to the load arm of the actuator. Without the aerodynamic cushion between the slider and the disk surface, the slider will come into contact with the disk surface and stiction may result. Stiction occurs as two very smooth surfaces stick to each other and effectively prevent the removal of one from the other. The stiction forces may be sufficient to prevent the rotation of the disk; but if the disk can be rotated, damage almost certainly will occur to the surface of the disk due to the fact that the slider is in contact with and stuck to the disk surface as the disk moves relative to the slider.

The magnetic recording head/slider can be parked in a landing zone or on an unload device. The actuator which moves the slider must be latched to prevent movement of the slider out of the parked position onto the data recording region of the magnetic disk.

Locking devices commonly are used to retain the actuator and accordingly retain the slider in a position whereby contact of the slider to the disk surface will cause no damage; alternatively, these devices maintain the slider in a position where it is unloaded from the disk surface.

The latching or locking devices previously used typically have been mechanical latches, electromechanical latches and solenoid activated locking devices. Mechanical latches typically are complex and require release mechanisms while the electromechanical latches require substantial electrical power to operate; in battery operated computers, the electrical power drain may severely shorten battery life.

The solenoid lock systems also are relatively large consumers of electrical power and are relatively large in size and thus require a significant number of parts with associated cost and reliability considerations.

SUMMARY OF THE INVENTION

To overcome the undesirable aspects and shortcomings of the prior approaches, it is an aspect of the invention to eliminate separate electronic circuits and substantial power consumption for the actuator latch.

It is another aspect of the invention to utilize magnetism to maintain the latch in a latched or unlatched position thereby eliminating complex mechanical and power consumptive electrical components.

In order to accomplish the aspects of the invention, a latch arm is provided which extends from and moves with the actuator of the disk drive. The latch arm essentially is an extension of the portion of the actuator which holds the coil used to control the position of the actuator device and the load beam/slider assembly.

A latch lever is provided for pivotal movement between the unlatched and the latched position. The latch lever is moved by engagement with the latch arm of the actuator and uses the motor of the actuator to provide much of the latching force necessary to displace the latch arm to its latched position from the unlatched position.

The movement of the latch arm beyond the span of the movement required for data reading and writing will position the latch arm with the end of the latch arm in a recess formed into the latch lever. Further movement of the slider from the recording area of the disk into the final parking position within the landing zone further displaces the distal end of the latch arm into the recess of the latch lever and causes engagement of the tip of the latch arm with the wall of the latch lever recess. As the latch arm continues to move toward its fully latched position, the latch lever engaged by the latch arm tip will pivot from a first limit stop to a second limit stop.

In order to retain the latching lever in one of its two bistable positions, the lever is magnetically held or detented in the unlatched position until the magnetic attractive force holding it in the unlatched position is exceeded by the force of the latch arm exerted on the lever.

To unlatch the actuator latch, the actuator is electrically powered to move the slider and load beam from the parking zone to the recording surface of the disk. As the slider and load beam move to the recording area of the magnetic disk, the latch arm again engages the wall of the recess in the latch lever thus urging the latch lever to its unlatched position. The force to unlatch the actuator latch and cause the movement of the latch lever from the latched to unlatched position is provided by briefly powering the coil of the voice coil motor which drives the actuator. The powering requirement for the voice coil motor is only a brief pulse, series of pulses or surges of electrical current within the coil sufficient to overcome the magnetic detenting force holding the latch lever in the latched or unlatched position. If necessary, the actuator may be powered in a latching direction and then the current reversed to attain maximum momentum, to impact the latch lever, effecting unlatching. With only a very brief period of increased electrical current flow, electrical power consumption necessary to latch or unlatch the actuator is minimized. The inertia of the actuator moving from its normal operating zone to position the slider in the landing zone and the normal operating levels of electrical current in the voice coil motor may be sufficient to operate the latch lever to lock or latch the actuator without any additional electrical power.

When the actuator arm and the actuator latch lever are in the locked position, the magnetic attraction holds the latch lever to prevent movement of the latch arm and the associated actuator. The actuator lock requires very few parts and no electrical power to hold the actuator in the locked position. Additionally, the actuator latch lever utilizes no electrical power to hold the latch in the inactive or unlocked position.

Only a pulse or series of pulses of elevated current flow in the actuator coil is required to develop sufficient force to displace the latch lever from the latched to the unlatched condition.

The magnetic attraction required to hold the latch lever stable in either the latched or unlatched positions may be provided by a magnet on the latch lever interacting with a magnetic limit stop. The limit stops may be in the form of pins extending transversely into the movement path of the latch lever. Alternatively, the limit stops may be formed of magnets and attract a magnetic insert in the lever.

A third embodiment may utilize one of the plate magnets of the actuator motor, which is fixed to the base member of the disk drive, to attract and hold the latch lever in a first or unlatched position. The first or unlatched stop member may be a portion of the base member, such as a wall portion or other surface, eliminating the need for a separate stop member.

The magnitude of the magnetic attraction force holding the latch lever in either the latched or unlatched positions may be tailored to the force capabilities of the actuator motor by interposing a non-magnetic material such as a plastic shim, sleeve or coating. The interposing of a layer or shim of non-magnetic material in the gap between the magnet and the magnetic material increases the gap and correspondingly decreases the magnetic attraction force therebetween. The latching and unlatching forces may be independently tailored by appropriate use of the geometry of the latch arms, air gaps, magnets, steel members as well as other flux control techniques.

A more complete and better understanding of the invention may be had by referring to the drawings and to the detailed description of the invention to follow.

DRAWINGS

DETAILED DESCRIPTION OF THE PREFERRED EMBODIMENTS OF THE BEST MODE CONTEMPLATED BY THE INVENTORS FOR CARRYING OUT THE INVENTION

Figure 1:
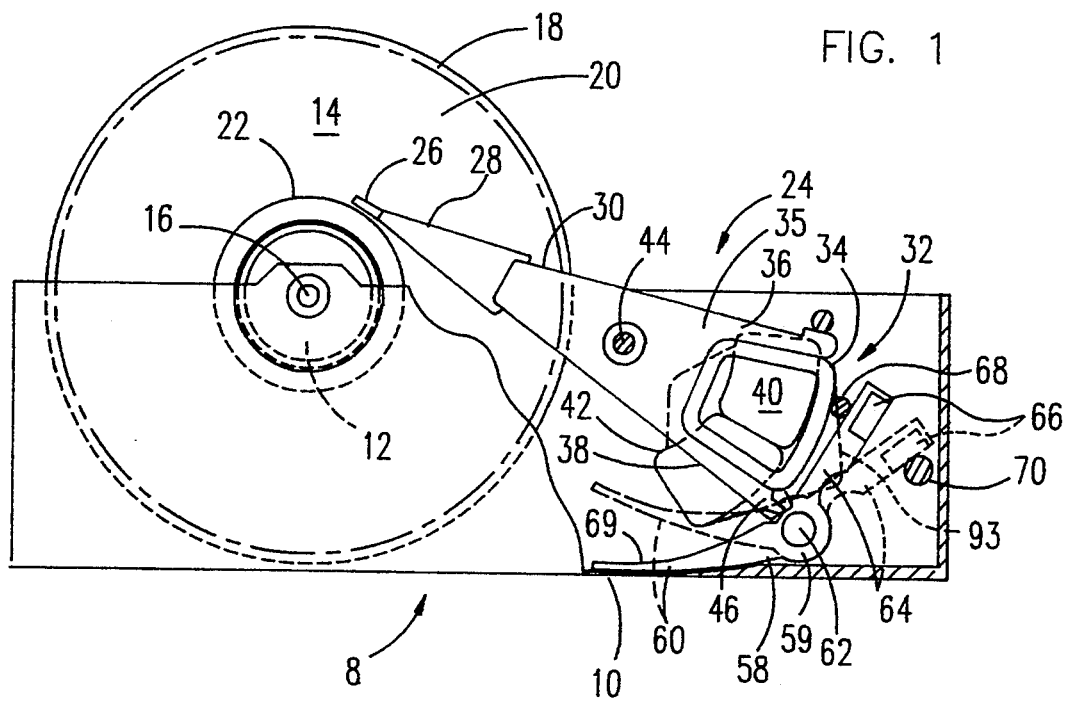
FIG. 1 illustrates a partial view of the disk drive incorporating the actuator latch.
Figure 2:
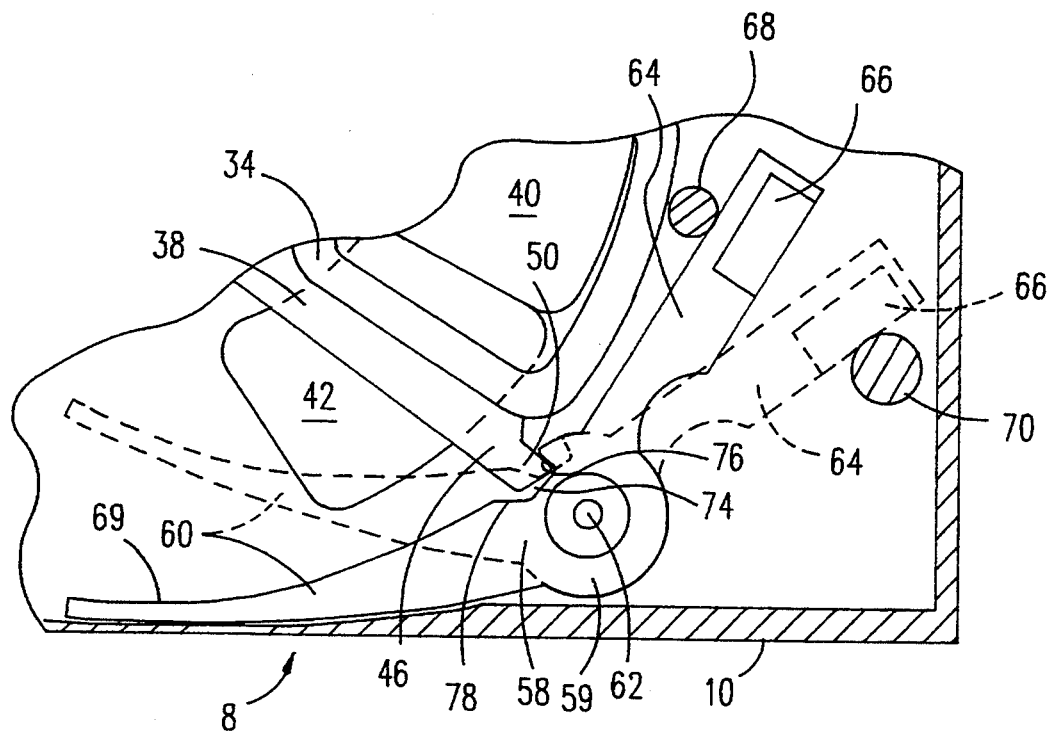
FIG. 2 illustrates in detail the actuator latch of the FIG. 1.

Referring now to FIGS. 1 and 2, a partial illustration of a direct access storage device or disk drive 8 is shown. The disk drive 8 has a frame 10 which acts to support all the other components of the disk drive 8. The frame 10 supports disk drive motor 12 which rotates disk 14 about axis 16. Disk 14 may be a stack of a plurality of disks or may be only a single disk, all coaxial to axis 16. The disk 14 which has a coating of magnetically recordable media, comprises several areas including an outer zone 18, a recording area 20, and a landing or parking zone 22. An actuator 24 provides the capability for sweeping the slider 26 supported by load beam 28 which is in turn attached to actuator arm 30. Actuator arm 30 is a portion of the actuator 24.

Actuator arm 30, load beam 28, and slider 26 are all controlled in their movement across the recording surface 20 of disk 14 by the actuator motor 32. Actuator motor 32 is comprised of a voice coil 34 supported between legs 36 and 38 of the actuator armature 35. Voice coil 34 interacts with a high flux density magnetic field created by plate magnets 40, 42. When an electrical current is provided to voice coil 34, the interaction between the magnetic field generated by the voice coil 34 and the magnetic fields of plate magnets 40 and 42 will cause the lateral movement of voice coil 34 and pivoting of actuator legs 36 and 38 and actuator arm 30 about axis 44. Leg 38 further is extended forming a latch arm 46.

In order to latch or lock latch arm 46 in a position to hold the actuator arm 30, load beam 28, and slider 26 in the region of the landing zone 22, it is necessary to engage the distal end 50 of latch arm 46.

Latch lever 58 is pivotally supported at pivot axis 62. The latch lever 58 is comprised of a first arm 60 and a second arm 64. Arm 64 is further provided with a magnet 66 which is inset into or attached to arm 64. Magnet 66 may engage with and be magnetically attracted to the unlatched limit stop 68 and the latched limit stop 70, respectively. Arm 60 of latch lever 58 is formed to have an arcuate surface 69. The arcuate surface 69 insures that latch lever 58 remains against and attracted to unlatch limit stop 68 during the time that the latch arm 46 and the distal end 50 thereof are in proximity to arcuate surface 69 of lever 58. Arm 60 of latch lever 58 is sufficiently long that the distal end 50 of latch arm 46 is always in confronting engagement with surface 69 at any time that latch arm 46 is not engaged in recess 74. Recess 74 is provided in the hub 59 and close to pivot axis 62 so that as slider 26 approaches the landing zone 22, the distal end 50 of latch arm 46 will enter the recess 74. Distal end 50 then will engage wall 76 of recess 74 exerting a force thereon and cause the rotation of lever 58 and arm 60 clockwise from a position adjacent to the unlatch limit stop 68 to a position proximate to and attracted to the latch limit stop 70.

As lever 58 is rotated clockwise about axis 62, the trailing wall 78 of recess 74 will be rotated and displaced to a position blocking the reverse movement of distal end 50 on latch arm 46.

Due to the magnetic attraction between magnet 66 and latched limit stop 70, when considering the relative moment arm length between the magnetic attractive force and the axis 62 and the moment arm length between the engagement point of latch arm 46 with recess wall 76 and the axis 62, it may be appreciated that a small latching force exerted by the magnetic attraction to limit stop 70 can inhibit a relatively larger force exerted by latch arm 46, thereby preventing accidental unlatching or unlatching as a result of an impact onto the disk drive frame 10. The orientation and direction of movement of the lever 58 under a torque caused by a jolt or impact which would tend to move the actuator 24 out of the parked position will tend to force latch lever 58 toward latched limit stop 70 with that force and the magnetic attraction force on the lever 58 being additive; therefore, the latching security is improved.

The construction of lever 58 typically is of a plastic material. The strength requirements for the material are well within those of common plastics, and therefore the structural strength of the latch lever 58 is not a significant consideration. A metal lever could be used, if desired, increasing the inertia of the lever 58.

FIGS. 1 and 2 illustrate the plate magnets 40, 42 underlying voice coil 34 and actuator legs 36, 38. In a completely assembled disk drive 8 apparatus, there is a similar pair of plate magnets or a shunt is placed above the voice coil 34 to complete the magnetic field with which voice coil 34 interacts. The magnet pole pieces or shunt overlying voice coil 34 are not illustrated for purposes of clarity in the illustration of the mechanism underlying them.

Figure 3:
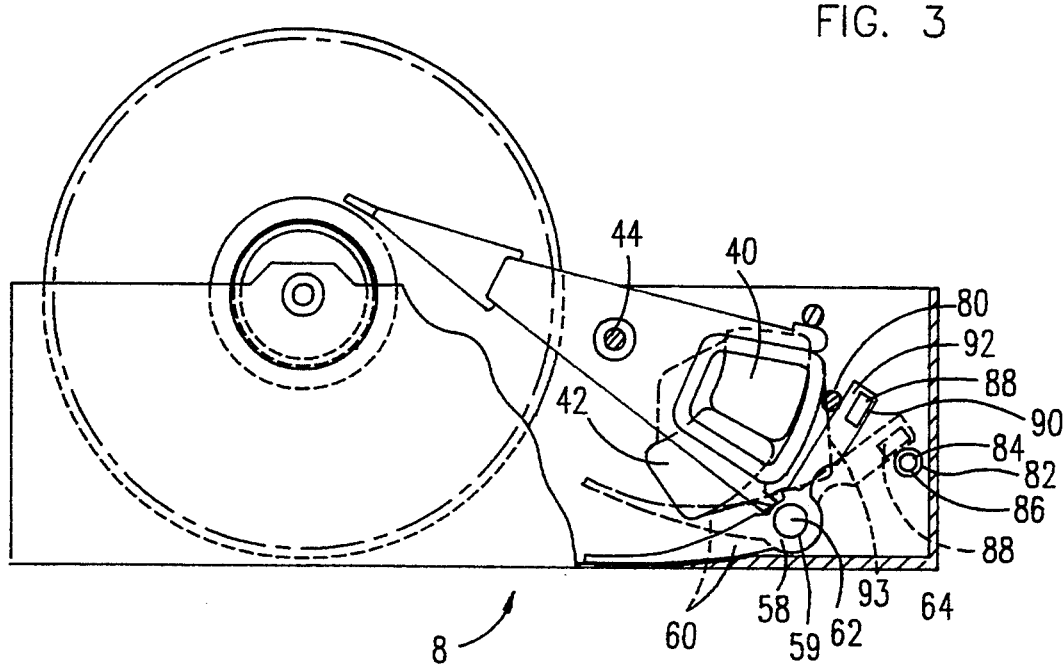
FIG. 3 illustrates a partial view of a disk drive incorporating a second embodiment of the actuator latch.
Figure 4:
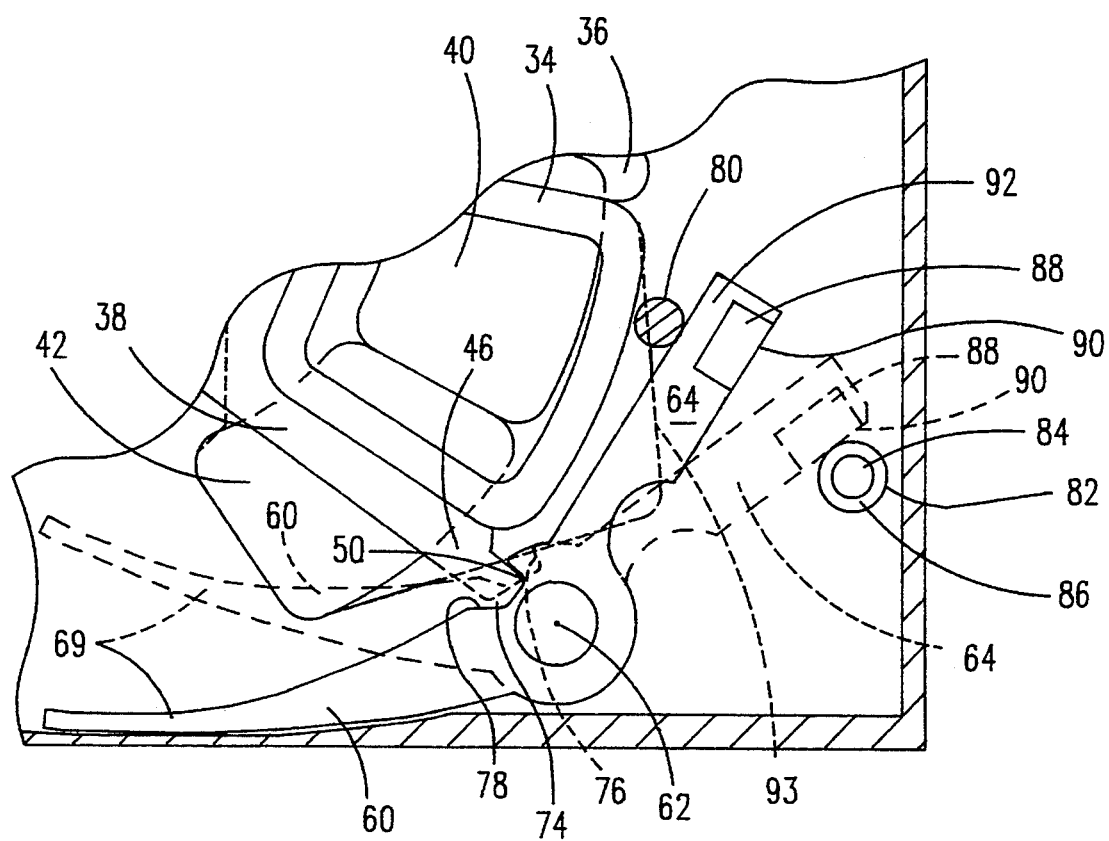
FIG. 4 illustrates in detail the actuator latch of FIG. 3.

Referring now to FIGS. 3 and 4, the second embodiment of the invention incorporates a steel insert 88 into latch lever arm 64 of latch lever 58. Latch lever arm 64 may totally contain the steel insert 88 as illustrated in FIG. 3 or the face 90 of steel insert 88 may be left exposed to confront the latched limit stop 82.

Latch lever arm 64 also comprises a thin portion 92 fabricated of the same plastic material as the latch lever 64. The thin portion 92 forms a spacer between steel insert 88 and unlatched limit stop 80 as well as a portion of the containment structure necessary to contain steel insert 88 within latch lever arm 64. Thin plastic portion 92 may be dimensioned to provide the desired gap and detenting force between magnet 84 and unlatched limit stop 80.

Unlatched limit stop 80 is provided in the form of a pin which may be fabricated from a cylindrical magnet. Magnet 80 then will provide an attractive force for steel insert 88 and magnetically detent the actuator latch lever 58 in its unlatched position. An alternative approach to obtain the necessary magnetic attraction is to fabricate the unlatched stop limit magnetic pin 80 from a steel which is highly magnetically permeable, such as 1018 steel. Supporting pin 80, either in the form of a magnet or in the form of a steel pin, is a shunt plate 93 which underlies plate magnets 40, 42. Due to the concentration of flux within the shunt plate 93, limit pin 80 becomes sympathetically magnetized and acts as the magnet to attract steel insert 88. Alternatively, a magnetic limit stop pin 80, fabricated from a magnet, may be attached to the shunt plate 93 to provide the stopping function as well as the necessary magnetic attraction.

The forces necessary to disengage lever 58 from the unlatched limit stop 80 and to disengage the lever arm 64 from latched limit stop 82 may be tailored to the forces capable of being generated by the actuator 24. The tailoring of these disengagement forces may be accomplished by controlling the thickness of the plastic material 92 on the lever arm 64 to effect a tailored and controlled spacing between magnetic unlatched stop limit 80 and steel insert 88. Likewise the magnetic gap between insert 88 and magnet 84 of latched limit stop 82 may be controlled by a coating or thickness of non-magnetic material 86, such as plastic, surrounding magnet 84. The thickness of the non-magnetic material 86 controls the gap and attraction force magnitude between magnet 84 and insert 88. The gap between the magnetic steel insert 88 and either magnetic limit stop 80 or magnet 84 controls the amount of force that is necessary to disengage the insert 88 from the magnetic field sufficiently that the latch lever 58 may be pivoted to the other of the two positions.

Figure 5:
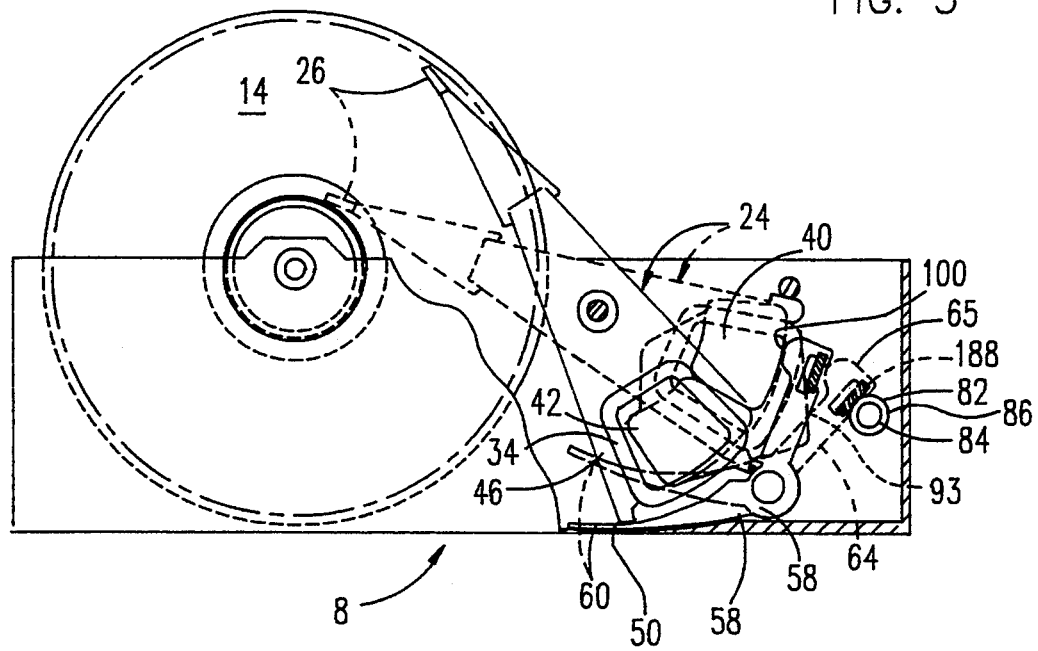
FIG. 5 illustrates a partial view of a disk drive with a third embodiment of the actuator latch.
Figure 6:
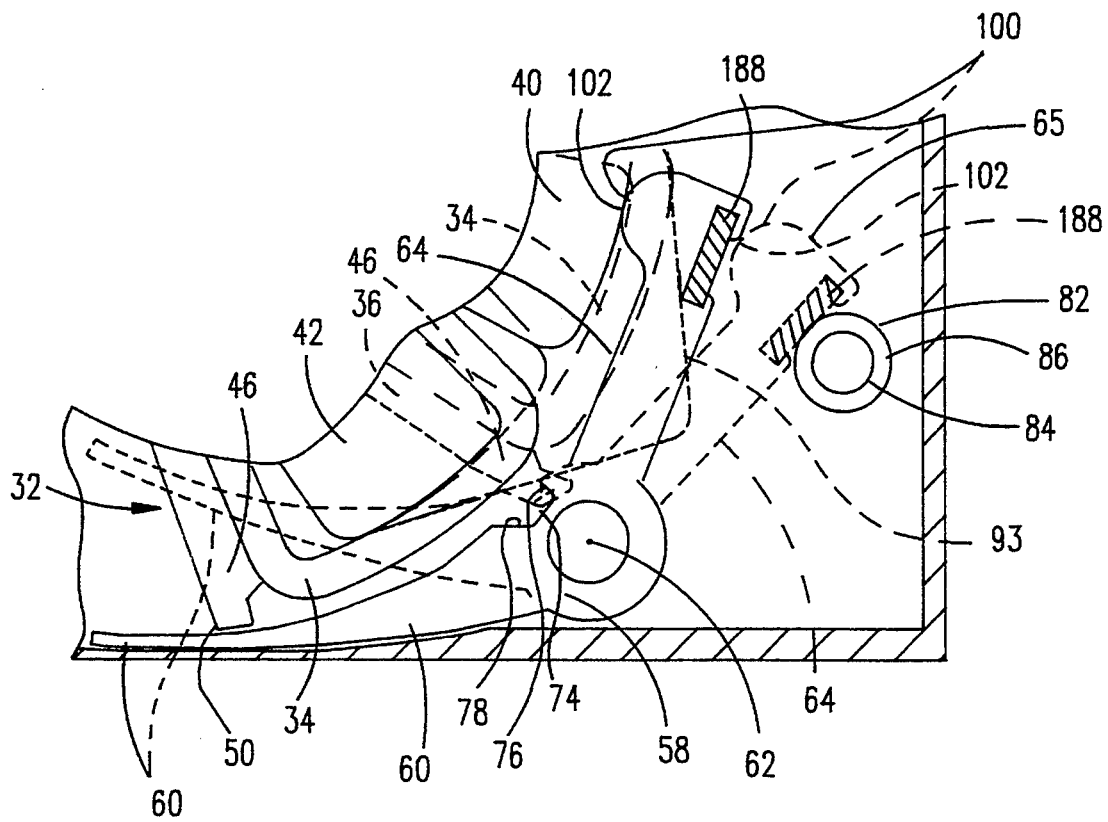
FIG. 6 illustrates in detail the third embodiment of the actuator latch.

Referring now to FIG. 5 and 6, a third embodiment of the actuator latch is illustrated. In FIG. 5 the third embodiment of the invention is illustrated along with a partial view of the disk drive within which it is embodied.

FIG. 6 is an enlarged view of the actuator latch and closely associated components of the actuator as illustrated in FIG. 5.

The actuator 24 in FIGS. 5 and 6 is identical to the actuators in FIGS. 1–4 and no further detailed description of actuator 24 is necessary.

Latch lever 58 is fabricated having an arm 64. Arm 64 carries in close proximity to its distal end 65 a steel insert 188. Steel insert 188 may confront and engage latched limit stop 82 which incorporates a magnet 84 and a non-magnetic coating or sleeve 86 identical to or analogous to the corresponding parts in FIGS. 3 and 4. The operation of the latch lever 58 with respect to the latched limit stop 82 is functionally identical to that described in FIGS. 3 and 4.

The control of the latch lever 58 through the magnetic attraction of magnetic steel insert 188 to attract latch lever 58 and to further hold latch lever 58 in its unlatched position is provided by plate magnet 40. Plate magnet 40 is a relatively strong magnet; and although most of the flux paths are substantially perpendicular to the plane of magnet 40, sufficient fringing flux surrounds the magnet 40 edges to provide a detenting and attractive force with respect to insert 188. Latch lever 58 and particularly lever arm 64 are fabricated to provide a positioning surface 100 in the form of a projection 102 extending out from the general conformation of latch lever arm 64. Projection 102 provides an optimum spacing between plate magnet 40 and insert 188 in the unlatched position to insure that the lever arm 60 clears the distal end 50 of latch arm 46 while at the same time provides control over the magnetic attraction between plate magnet 40 and insert 188. Positioning surface 100 of projection 102 engages the edge of magnet 40 and eliminates the need for a limit stop defining the unlatched position such as unlatched limit stop 80.

The control of the magnetic attraction between plate magnet 40 and insert 188 is essential to limit the maximum or peak disengagement force necessary to overcome the magnetic attraction between magnet 40 and insert 188 and to oscillate the latch lever 58 to the latched position 82 to a magnitude less than that which can reliably be overcome by the actuator motor 32. The manufacture of latch lever 58 to accommodate this environment only requires a minor modification in the mold for lever 58 to secure the appropriate dimensional projection 102 necessary for optimum operation.

It can be seen from the foregoing that all three embodiments utilize the magnetic attraction between a magnet and a magnetically permeable material to detent latch lever 58 in either a latched or an unlatched position. The control of the forces necessary to disengage the latch lever 58 from the limit stops 68, 70, 80 or 82 are all controllable by judicious selection of gap dimensions between the magnet and the magnetically attractable inserts 88 or 188 in latch lever 58. While latch lever 58 has been described as fabricated from a rigid plastic, other non-magnetic or magnetic materials such as aluminum, zinc, or steel could be readily substituted as desired.

It should be understood that where a magnetically attractable member is described as steel, any magnetically attractable material can be substituted, as desired.

As is readily understood from the foregoing description and drawings, relatively large impact forces may be experienced by the disk drive frame 10 and transmitted to the actuator 24 whenever the actuator 24 is in a latched condition with the latch lever arm 64 engaged with the latch limit stop 70 or 82. The actuator 24 will be latched and restricted in movement about its axis of rotation 44. With the immobilization of the actuator 24 by the latch lever 58, the possibility of recording area 20 damage is greatly reduced.

With the fabrication of the latch lever 58 of a plastic material with a relatively low mass, the possibility of the mass imbalance of the latch lever 58 figuring significantly into the unlatching of the actuator 24 due to an impact on the disk drive frame 10 is greatly reduced to the point that the imbalance of the lever 58 may be controlled by the magnetic attraction between a magnet and the magnetically attractable material of the actuator latch 24. The preferred design of latch lever 58 is a mass distribution balanced about axis 62 but imbalances may be tolerated if necessary for a particular design implementation.

One skilled in the art will appreciate that the invention disclosed herein removes all the magnetic bias forces on the actuator created by prior art magnetic latches and eliminates the need to compensate for such magnetic bias forces when driving the actuator motor 32. This simplifies the design of the control algorithm which controls the current flow in coil 43 to accurately position actuator 24.

It will be appreciated and understood that other modifications may be made to the embodiments described above without removing the invention from the scope of the appended claims hereto.

We claim:

1. A direct access storage device for storing data on a magnetic disk comprising:
   a rotatable disk having a magnetic recording media on at least one surface thereof and having an axis of rotation;
   a base member supporting said drive motor and said disk;
   an actuator having an actuator drive motor disposed on said base member and displaced from said disk, said actuator comprising a load beam having a distal end projecting from said actuator and toward said surface of said disk, said actuator further pivotable relative to said base member about an axis parallel to said axis of rotation to translate said load beam distal end across said surface of said disk between an inner limit of travel and an outer limit of travel;
   said actuator further comprising a latch arm protruding away from said disk and having an end;
   an actuator latch for holding said actuator and said load beam in a restricted position relative to said axis of rotation, said actuator latch comprising a latch member pivotable between two positions, said positions being defined by engagement of said latch member with stop members, said latch member held in each of said positions by a magnetic attraction;
   said latch member further including a recess engageable with and by said latch arm, said recess pivotable with said latch member from a first position where said latch arm end may enter said recess to a position trapping said latch arm end, said latch member moveable from first of said two positions to a second of said two positions responsive to forces exerted by said latch arm on surfaces defining said recess, said latch member held in each one of said two positions by a magnetic attraction force, said magnetic attraction force in each of said positions defeatable by forces exerted on said latch member and said recess by said actuator drive motor.

2. The disk drive of claim 1 wherein said latch member includes a magnet disposed on an arm thereof and said stop members include a magnetically permeable material to which said magnet and said one arm are attracted.

3. The disk drive of claim 2 wherein said stop members further include a non-magnetically attractable gap disposed intermediate said magnetically permeable stop member and said magnet, thereby defining a force level necessary to overcome said magnetic attraction.

4. The disk drive of claim 3 wherein surfaces of said recess engage said latch arm at a first moment arm distance from said pivot of said latch member and said magnetic attraction forces are disposed at a second moment arm distance from said pivot of said latch member.

5. The disk drive of claim 3 wherein said non-magnetic gaps define said magnetic attraction forces so that a force to overcome said attraction force to unlatch said actuator exceeds a force required to overcome said attractive force to latch said actuator.

6. The disk drive of claim 1 wherein one of said stop members comprises a magnet and said latch member comprises a magnetic attractable material.

7. The disk drive of claim 6 wherein said actuator comprises a magnet fixed relative to said base member, said magnet disposed relative to said latch member to attract said latch member to one of said two positions against one of said stop members.

8. A magnetic bistable actuator latch for a disk drive actuator, having no magnetic bias on said actuator comprising:
   a latch arm pivotable by said actuator;
   a pivotable latch lever comprising a latching recess and a pair of arms extending from a pivot axis;
   said arms pivotally displaceable between two positions defined by two stop limit members, said lever magnetically attracted to each of said two positions;
   said lever defining said latching recess, said recess engageable by said latch arm and said lever pivotally displaceable by said latch arm, thereby pivoting said lever from one of said two positions to another of said two positions, said recess enterable by said latch arm in one of said lever positions and said recess disposed in a movement limiting orientation relative to said latch arm in the other of said lever positions,
   whereby, said magnetically attracted lever is held in said one position permitting entry of said latch arm into said recess and is magnetically held in said other position resisting movement of said latch arm when said lever is pivoted to said other position.

9. The latch of claim 8 wherein said lever carries a magnet and said magnet is attracted alternately to said stop limit members.

10. The latch of claim 9 wherein said magnet and each of said stop limit members are separated by at least a non-magnetic material of a selected thickness, thereby controlling magnetic attraction magnitude.

11. The latch of claim 8 wherein said lever includes magnetically attractable material and at least one of said stop limit members comprises a magnet, thereby attracting said lever to said member and holding said lever until said holding is overcome by a force on said lever from said latch arm.

12. The latch of claim 11 further comprising an electric motor having at least one permanent magnet and at least one coil moveable relative to said permanent magnet, said magnet forming a magnetic field for interaction with said coil, said magnetic field disposed relative to said lever and attractive of said lever when said lever occupies a position proximate to said motor magnet.

13. A direct access storage device comprising:
a rotatable disk;
a disk drive motor drivingly engaged with said disk;
a slider incorporating a magnetic recording head;
an actuator for positioning said slider relative to said disk;
said actuator including an arm projecting away from said slider;
a magnetically detented bistable latch lever, said latch lever acted upon by a magnetic detenting force, said lever engageable by said arm and displaceable by said arm from an unlatched position to a latched position, said lever including a latching recess therein displaceable relative to said arm to block and to restrict movement of said arm and said actuator when movement of said actuator exerts a force on said lever less than that required to overcome said magnetic detenting force.

* * * * *